Sept. 25, 1962 W. B. WESTCOTT, JR 3,055,170
LIQUID THERMAL ENGINE
Filed April 14, 1958 10 Sheets-Sheet 1

INVENTOR.
WILLIAM B. WESTCOTT, JR.
BY
ATTORNEY

INVENTOR.
WILLIAM B. WESTCOTT, JR.
BY

ATTORNEY

INTAKE

COMPRESSION

POWER

EXHAUST

INTAKE

COMPRESSION

POWER

EXHAUST

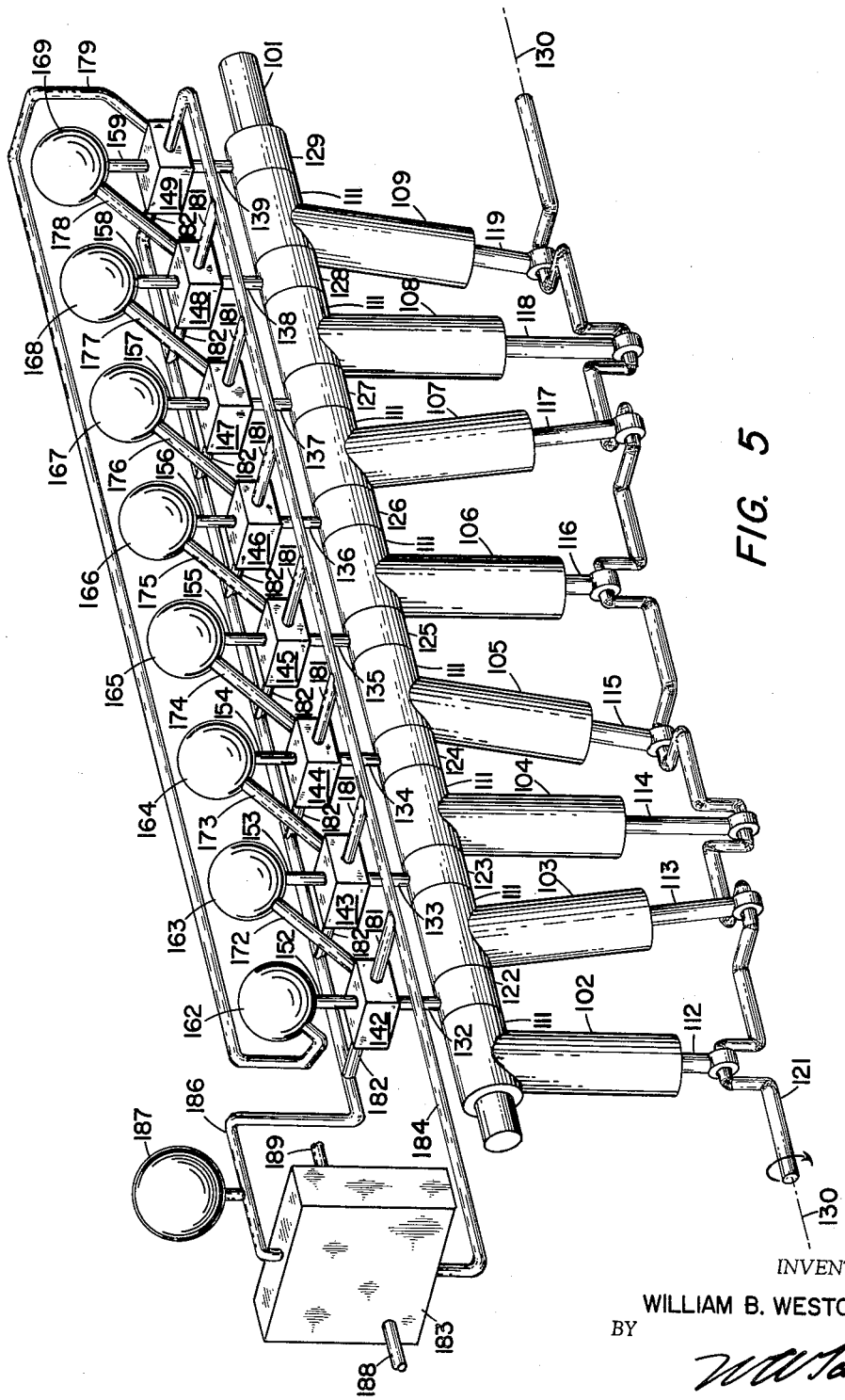

Sept. 25, 1962     W. B. WESTCOTT, JR     3,055,170
LIQUID THERMAL ENGINE

Filed April 14, 1958                                                        10 Sheets-Sheet 5

INVENTOR.
WILLIAM B. WESTCOTT, JR.
BY

ATTORNEY

Sept. 25, 1962  W. B. WESTCOTT, JR  3,055,170
LIQUID THERMAL ENGINE
Filed April 14, 1958  10 Sheets-Sheet 6

INVENTOR.
WILLIAM B. WESTCOTT, JR.
BY
ATTORNEY

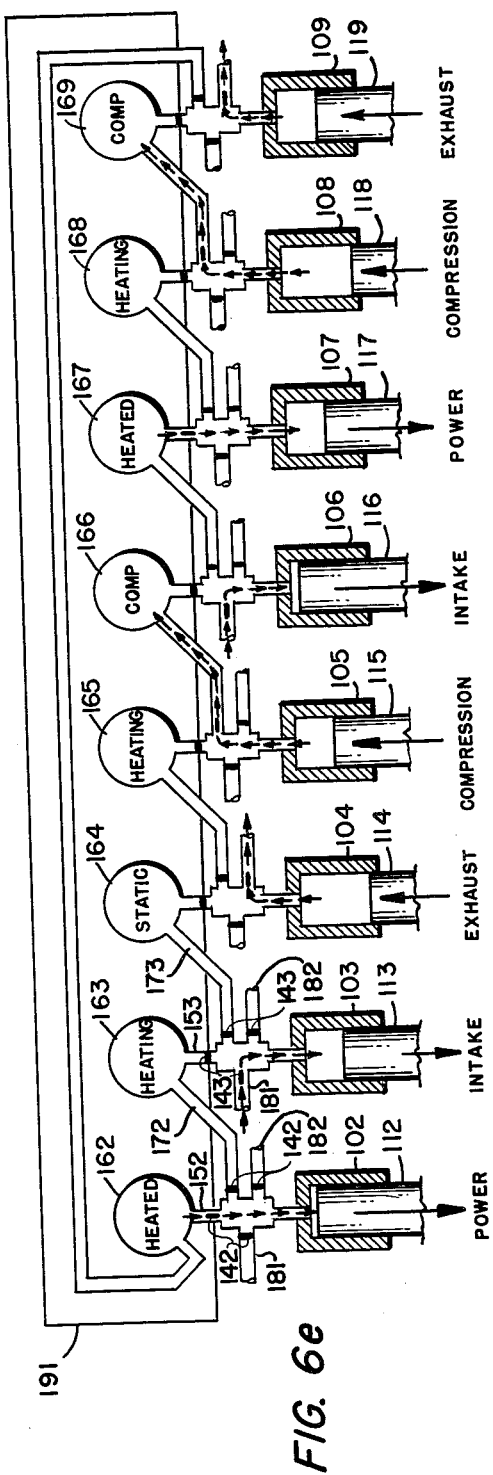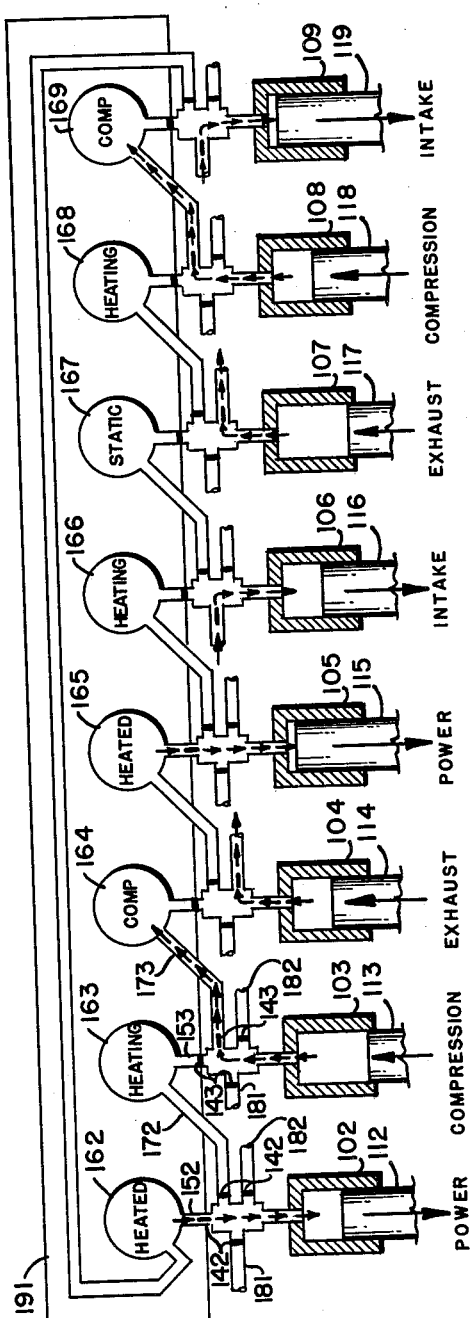

Sept. 25, 1962 W. B. WESTCOTT, JR 3,055,170
LIQUID THERMAL ENGINE
Filed April 14, 1958 10 Sheets-Sheet 8

INVENTOR.
WILLIAM B. WESTCOTT, JR.
BY
ATTORNEY

Sept. 25, 1962 W. B. WESTCOTT, JR 3,055,170
LIQUID THERMAL ENGINE
Filed April 14, 1958 10 Sheets-Sheet 9

INVENTOR.
WILLIAM B. WESTCOTT, JR.
BY
ATTORNEY

Sept. 25, 1962   W. B. WESTCOTT, JR   3,055,170
LIQUID THERMAL ENGINE

Filed April 14, 1958   10 Sheets-Sheet 10

INVENTOR.
WILLIAM B. WESTCOTT, JR.
BY
ATTORNEY

United States Patent Office 3,055,170
Patented Sept. 25, 1962

3,055,170
LIQUID THERMAL ENGINE
William B. Westcott, Jr., Cleveland Heights, Ohio, assignor to Cleveland Pneumatic Industries, Inc., Cleveland, Ohio, a corporation of Ohio
Filed Apr. 14, 1958, Ser. No. 728,307
10 Claims. (Cl. 60—23)

This invention relates to engines and more particularly to a new engine which is operated by expansion of fluid maintained in the liquid state throughout the operation of the engine.

In the past, engines have operated by utilizing expansion of heated fluid in the gaseous state working against a movable surface to produce mechanical energy. This is true in steam engines and turbines, internal combustion engines of all types and thermal engines of the hot air types. Because gas is highly compressible, relatively high temperatures must be utilized in gas engines to develop adequate pressures and since the pressures developed in gas engines are relatively low, large size engines must be used to develop significant amounts of power.

An engine according to this invention utilizes fluid in the liquid state at relatively high pressures. Since liquids are not easily compressed, small increases in temperature develop very large pressures which are utilized to operate the engine even at low temperature differentials. Also, since the pressure level of the engine is very high when compared with gas engines above referred to, a small structure can be used to produce large amounts of power. In addition, according to this invention, high torques are produced so a given horsepower is produced even at low speeds.

It is an important object of this invention to develop power by utilizing the forces produced by the compression and heating of a fluid within the liquid state.

It is another object of this invention to produce mechanical power from a heat source of a relatively low temperature.

It is still another object of this invention to provide a high output liquid engine which uses relatively small volumes of working liquid, thereby resulting in a small, compact, and relatively lightweight engine.

It is still another object of this invention to provide a high torque engine which is compact and structurally simple.

It is still another object of this invention to operate an engine at pressures sufficiently high to produce usable compression of liquids.

It is still another object of this invention to provide a high efficiency, high output engine suitable for use in connection with a heat source such as atomic energy, solar energy, waste heat from other processes, or heat sources existing in nature.

Further objects and advantages will appear from the following description and drawings, wherein:

FIGURE 5 is a schematic view of a multi-cylinder engine, according to this invention, with parts removed for purposes of clarity;

FIGURES 6a through 6h are schematic views of the engine shown in FIGURE 5 showing the sequence of operation through one full cycle;

Figure 1:
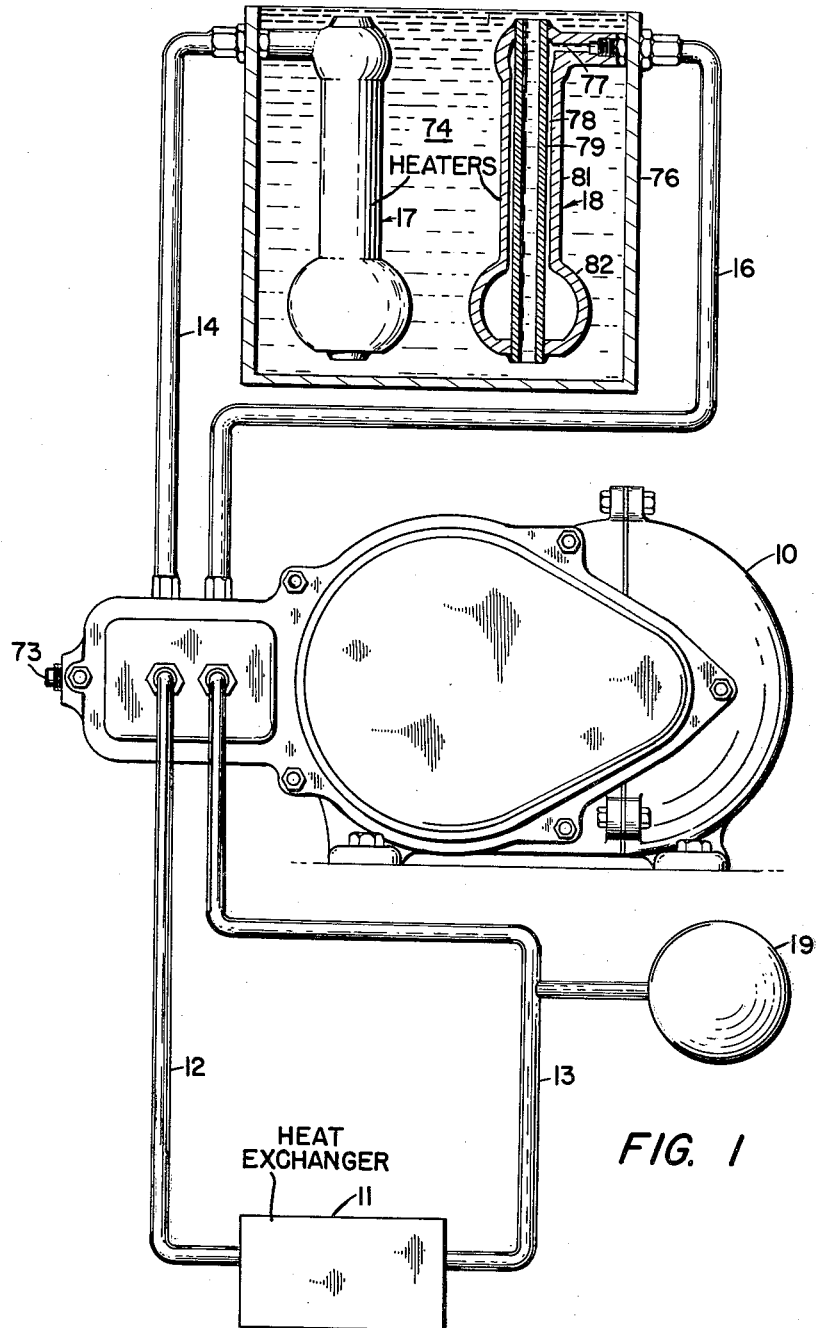
FIGURE 1 is a view of a one cylinder engine system with portions thereof shown as cross section.

In an engine according to this invention, a liquid cycle is utilized in which heated, compressed liquid is expanded against a working surface to produce mechanical power. This expansion of the liquid reduces the pressure of the liquid, converting heat energy into mechanical work, and is referred to herein as "elastic" expansion, as distinguished from thermal expansion. In the particular embodiment disclosed, the cycle comprises the steps of mechanically compressing the liquid, adding heat to the liquid while it is compressed and expanding the liquid against a working surface to convert at least a portion of the heat energy of the liquid to mechanical power. The compression takes place in a relatively short period of time after which the heat energy is added to the liquid to elevate its temperature and pressure for a relatively long period of time. After the liquid has been compressed and heated, it is expanded against a piston working in a cylinder. Although the steps of the cycle performed by the illustrated engine are substantially sequential, the heating and expanding of the liquid may be partially or entirely simultaneous. In such cases, the temperature of the liquid may increase due to the addition of heat, may decrease due to the removal of work energy therefrom, or may remain constant. Also in the illustrated embodiments, a closed cycle engine is used wherein the liquid is cooled after it has performed the work so that cool liquid is compressed prior to heating. In some cases, such as an open cycle engine, the liquid may not be cooled and new cool liquid may be supplied from a separate source. In any case, the temperature of the heat source is maintained above the temperature of the mechanically compressed liquid so that the liquid can be further heated.

Referring now to the drawings, FIGURES 1 through 4 illustrate a one cylinder engine, according to this invention, with its associated heater and cooling heat exchanger. The engine 10 is connected to the cool or outlet side of a heat exchanger 11 by a line 12 and to the hot or inlet side of the heat exchanger 11 through a line 13. Thus, when the engine operates, cool liquid is supplied to the engine through the line 12. After the cool liquid enters the engine 10, it is compressed and alternately pumped through high pressure lines 14 and 16 to heater units 17 and 18 respectively. After the liquid is heated within the heater units 17 and 18, as will be described below, it returns to the engine 10 at a higher pressure and is expanded against a piston to produce work. After the liquid has produced the mechanical work, it is cooled. Because the liquid within the cooling circuit varies in volume, an accumulator 19 is connected to one or the other of the lines 12 or 13 to prevent an undesirable buildup of pressure within the cooling circuit to supply make-up liquid to replace leakage and to maintain a predetermined supply pressure on the circuit. As shown, it is connected to the line 13.

Figure 2:
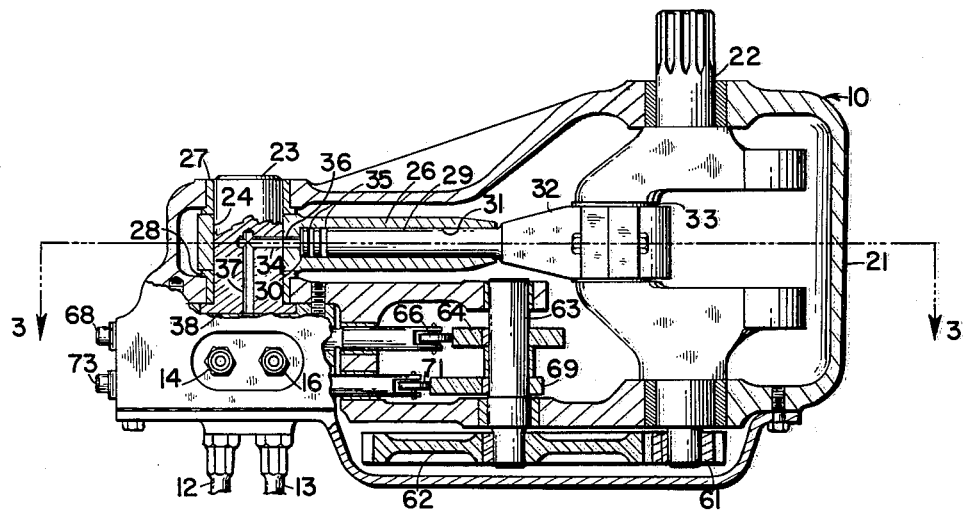
FIGURE 2 is a plan view partially in sections showing the structural details of the engine drive mechanism.
Figure 3:
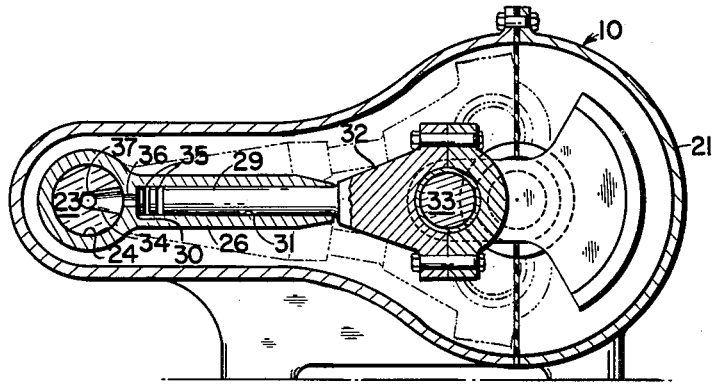
FIGURE 3 is a side elevation partially in longitudinal section taken along 3—3 of FIGURE 2.

Referring now to FIGURES 2 and 3, the engine 10 includes a housing assembly 21 in which is journalled a crankshaft 22. Also mounted in the housing assembly 21 is a cylinder pivot pin 23 which projects through a bore 24 formed in a cylinder head 26. A pair of opposed bushings 27 and 28 support the cylinder pivot pin 23 within the housing assembly 21 and also provide opposed radial walls which engage opposite sides of the cylinder head 26 and prevent axial movement thereof along the cylinder pivot pin 23. Thus, the cylinder head 26 is supported in the housing assembly 21 against motion, excepting rotary motion in a plane perpendicular to the axis of the cylinder pivot pin 23 as shown by the phantom positions of FIGURE 3. A piston 29 extends into a cylinder bore 31 formed in the cylinder head 26 and is axially movable relative thereto. Seals 35 are mounted on the piston 29 and provide a sealing engagement between the piston 29 and the cylinder bore 31 so that axial movement of the piston 29 causes a change in displacement of the chamber 30 above the piston 29 within the cylinder head 26. The right hand end of the piston 29 is formed with a journal bearing 32 connected to an eccentric bearing 33 on the crankshaft 22. Thus, as the crankshaft 22 rotates, the piston 29 reciprocates or strokes in and out of the cylinder head 26. To eliminate the usual connecting rod producing side loads on the piston, I utilize the pivotal connection of the cylinder head 26 on the cylinder pivot pin 23 as described above. Thus, the cylinder head 26 oscillates around the cylinder pivot pin 23 when the crankshaft 22 rotates.

The cylinder pivot pin 23 is formed with a radial passage 34 which is open to an axial passage 36 formed in the cylinder head 26. The radial passage 34 in turn connects with an axial passage 37 in the cylinder pivot pin 23 so that fluid communication is provided between the end surface 38 of the cylinder pivot pin 23 and the cylinder bore 31 above the piston 29. The radial passage 34 should be enlarged, as shown in FIGURE 3, at its outer end so that it maintains communication with the passage 36 in all positions of the cylinder head 26 and, in effect, provides a swivel connection.

Figure 3A:
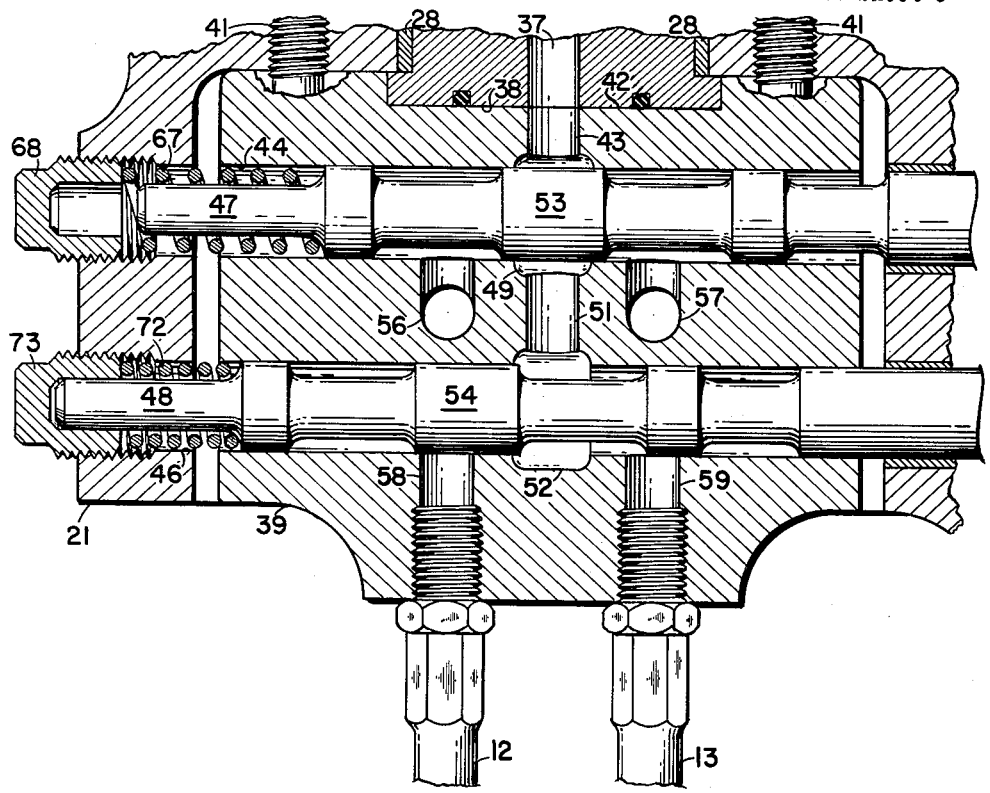
FIGURE 3a is an enlarged fragmentary section of the valve mechanism.

Referring to FIGURE 3a, a valve block 39 is mounted in the housing assembly 21 by bolt fasteners 41 and is provided with a side face 42 positioned against the end surface 38 of the cylinder pivot pin 23. A passage 43 is formed in the valve block 39 and communicates with the axial passage 37. The valve block 39 is also formed with a first valve bore 44 and a second valve bore 46 in which are positioned spool valves 47 and 48 respectively. An annular groove 49 within the bore 44 in the valve block 39 communicates with the passage 43 on one side and a second passage 51 which in turn communicates with an annular groove 52 within the bore 46. Thus, the cylinder bore 31 is always in communication with the two annular grooves 49 and 52 through the passages 34, 36, 37, 43, and 51. The spool valve 47 is formed with a central land 53 adapted to close the annular groove 49 when the valve is in the off position and the spool 48 is formed with a central land 54 adapted to close the annular groove 52 when the spool 48 is in its off position. It should be noted that, in FIGURE 3a, the spool valve 48 has been displaced from the off position but that the central land 54 is movable to cover the annular groove 52 and isolate the lines 12 and 13 from the rest of the system.

A pair of ports 56 and 57 connect with the valve bore 44 on either side of the annular groove 49 and in turn to the pressure lines 14 and 16 shown in FIGURES 1 and 2. Thus, when the valve spool 47 is moved to the left from its central position, the port 57 is connected to the annular groove 49 so the pressure line 16 is connected to the cylinder bore 31. Conversely, if the valve spool 47 is moved to the right from the off position shown, the port 56 and in turn the pressure line 14, is connected to the cylinder bore 31. Two additional ports 58 and 59 are formed in the valve block 39 and communicate with the second valve bore 46 on either side of the annular groove 52 and connect to the lines 12 and 13 respectively. Thus, when the valve spool 48 is in the position shown in FIGURE 3a, the line 13 is in communication with the cylinder bore 31. When the valve spool 48 moves to the position wherein the central land 54 covers the annular groove 52, both of the lines 12 and 13 are isolated from the cylinder bore 31 and further movement to the right brings the line 12 into communication with the cylinder bore 31. Therefore, the valve spools 47 and 48 can be selectively operated to provide communication between the cylinder bore 31 and any of the lines 12, 13, 14, or 16.

Referring again to FIGURE 2, mounted on one end of the crankshaft 22 is a timing gear 61 which intermeshes with a second timing gear 62 mounted on a cam shaft 63 journalled in the housing assembly 21. Thus, when the crankshaft 22 rotates, the cam shaft 63 is rotated with a fixed ratio of relative velocities. In the illustrated engine, the timing gears 61 and 62 are sized so that the cam shaft rotates one revolution every time the crankshaft 22 rotates through four revolutions so the timing gears provide a 4:1 gear reduction. A first cam 64 is mounted on the cam shaft 63 and is arranged to engage a cam follower 66 on the first valve spool 47. As shown in FIGURE 3a, a spring 67 is positioned against the outer end of the spool 47 by a cap 68 threaded into the end of the housing assembly 21 to resiliently maintain the cam follower 66 in engagement with the cam 64. Thus, as the cam shaft 63 rotates, the cam 64 operates the first valve spool 47. A second cam 69 is mounted on the cam shaft 63 and is engaged by a cam follower 71 mounted on the end of the second valve 48. Here again, a spring 72 is held against the second valve spool 48 by a cap 73 so the cam follower 71 is resiliently maintained in engagement with the cam 69.

Referring to FIGURE 1, one form of heater structure is shown in the longitudinal section of the heater 18. In this design, the pressure line 16 connects to the upper end of the heater 18 through a port 77. The port 77 communicates with an annular chamber 78 defined by a central tubular member 79 and an outer housing 81. The annular chamber 78 has a relatively small radial width but a very large area when considering the volume so that heat will flow through both the inner wall of the tubular member 79 and the outer housing 81 bordering the annular chamber 78. Rapid heat transfer is achieved with relatively low temperature differentials because of this large area compared to a relatively small mass of liquid being heated. The lower end of the outer housing 81 is formed with an enlarged portion 82 which has a substantially larger volume than the volume of the annular chamber 78. The tubular member 79 and the housing are sealed at their ends by welds. In operation, the heater is filled with liquid even when it is not compressed. However, when additional liquid is pumped into the heater 18 through the pressure line 16, it compresses the original liquid by displacing the original liquid down along the annular chamber 78. The various proportions are preferably arranged so the volume of the annular chamber 78 is at least equal to the compressed volume of liquid pumped into the heater 18 during the compression stroke. In effect, the original liquid contained within the heater 18 is compressed into the enlarged portion 82 and operates as a liquid spring. The cool liquid contained within the annular chamber 78 is then heated. This elevates the temperature and the pressure of the liquid contained within the heater 18 until the heater is again connected to the cylinder bore 31. The heated liquid within the chamber 78 is then caused to flow back through the pressure line 16 into the cylinder bore by expansion of the compressed liquid, including that originally contained within the heater and located within the enlarged portion during the heating phase. In the illustrated embodiment, hot liquid 74 within a heater container 76 is used as the source of heat for the heaters 17 and 18 but any suitable source of heat such as hot gases, flames, or other available forms of heat can be used to supply heat to the heaters 17 and 18.

Although the piston 29 operates on a four-stroke cycle including the usual intake, compression, power, and exhaust strokes, the heaters 17 and 18 operate through a cycle which requires four complete revolutions of the crankshaft 22, and it is for this reason that a four to one gear reduction is used in driving the cam shaft 63 to provide proper synchronism of the engine at all times.

Referring now to FIGURES 4a through 4h, the engine system is shown schematically in each stroke of operation. In these views, similar numerals are used to indicate the corresponding elements but some parts have been eliminated for purposes of clarity. Because each of the valve spools 47 and 48 operate to change the flow in two fluid lines, the valve spool 47 is indicated by two schematic valves indicated as short dashes 47a and 47b which are in the lines 14 and 16 respectively. The valve spool 48 is similarly indicated at 48a and 48b in the lines 12 and 13 respectively. These schematic valves cross the associated lines when the valves are closed and are aligned with the lines when the valves are open for liquid flow.

In order to indicate the condition of the liquid and the various portions of the system, I have indicated in the heaters the phase through which the liquid is passing. As an example, "comp." is indicated in the heater which is being compressed, "heating" indicates that the liquid is in the process of being heated and is isolated from the rest of the system, "heated" indicates that the liquid has been heated and is connected to the cylinder to provide a power stroke, and "static" indicates that the liquid originally within the heater is at low pressure. It should be understood that the liquid within the lines 12 and 13 and within the cooling heat exchanger 11 is at a low pressure determined by the accumulator 19.

Figure 4A:
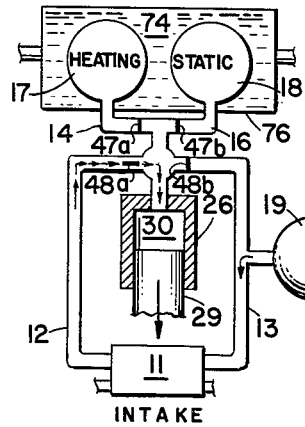
FIGURES 4a through 4h are schematic illustrations of the one cylinder liquid engine showing the operating conditions through an entire cycle of operation.
Figure 4B:
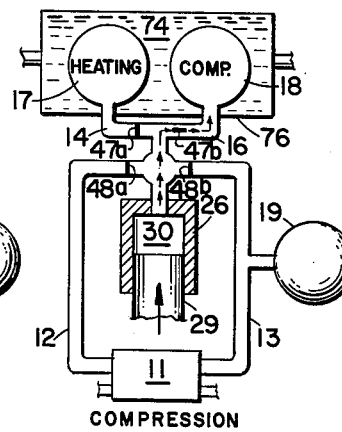

In FIGURE 4a, the piston 29 is moving downwardly relative to the cylinder head 26 as indicated by the arrow on the piston 29. At this time, the piston is on an intake stroke and cool liquid under low pressure passes from the heat exchanger 11 through the line 12 into the chamber 30 in the cylinder head 26. The valve 48a is in a position to provide fluid communication between the chamber 30 and the line 12, and the exhaust valve 48b isolates the line 13 from the chamber 30. The valve spool 47 is shown schematically at 47a and 47b and is in the off position so that the two heaters 17 and 18 are isolated from the chamber 30. Therefore, as the piston 29 moves down, cool liquid flows from the heat exchanger into the chamber 30. Because of this flow out of the low pressure side of the system, the accumulator 19 supplies liquid to the line 13.

Figure 4C:
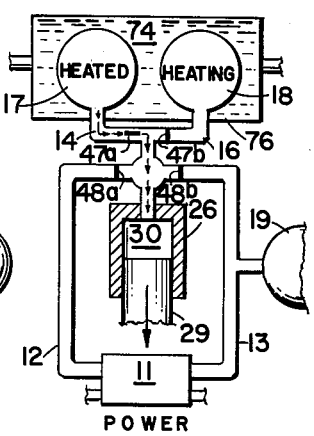
Figure 4D:
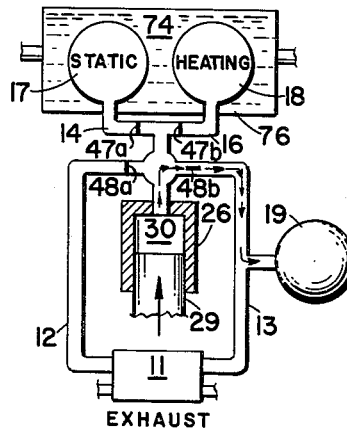

After the piston 29 is moved downward to complete the intake stroke, the chamber 30 above the piston contains cool liquid about to be compressed during the next stroke of the piston. When the piston 29 begins its inward or compression stroke as indicated by the arrow in FIGURE 4b, the valve positions are changed by the cams shown in FIGURES 2, 8a and 8b to establish fluid communication between the heater 18 and the chamber 30 through the valve 47b and all of the other valves are closed. On this in stroke, the liquid is compressed in the heater 18 to a relatively high pressure which is determined by the compression ratio and the particular liquid. For example, hydraulic fluid identified by the military specification No. MIL-O-5606, entitled "Oil, Hydraulic, Aircraft, Petroleum Base" approved January 31, 1950, by the U.S. Air Force and Navy Departments, reaches a pressure of 50,000 pounds per square inch when it is compressed about 10%. When compressed adiabatically from normal temperature and pressure to pressures of this order, the temperature of this liquid rises, but remains sufficiently low to permit heat to be added readily from a low temperature source, such as a source at about 400° F. At the completion of the compression stroke, cool liquid from the chamber 30 is added to the liquid already filling the heater 18 as hereinafter explained, thereby subjecting the liquid within the heater to a pressure within the range above indicated. The valving then changes, as shown in FIGURE 4c to provide fluid communication between the heater 17 and the chamber 30 and, at the same time, the other valves are closed. The heated liquid within the heater 17 is at a higher pressure due to the added heat so it produces a force on the piston 29 which is greater than the force necessary to compress the cool liquid and, therefore, produces usable power on its power stroke. After the power stroke, only the valve 48b is held open by the cams and the piston 29 again moves into the cylinder head 31 to perform an exhaust stroke, as shown in FIGURE 4d. In this stroke, the chamber 30 is connected to the line 13 by the opened valve 48b, thereby causing the liquid to be expelled from the chamber 30 to the accumulator 19. At the completion of the exhaust stroke, the liquid within the heater 17 is at low pressure while the pressurized liquid in the heater 18 is being heated at high pressure.

Figure 4E:
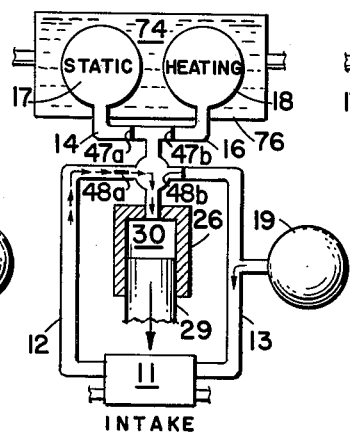
Figure 4F:
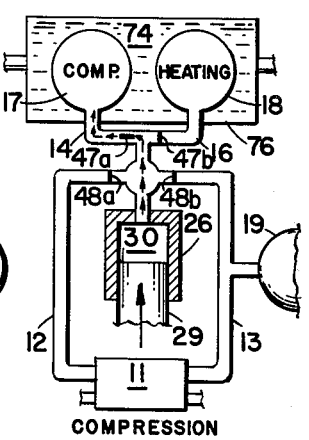
Figure 4G:
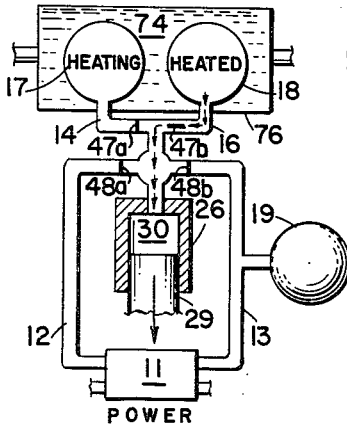
Figure 4H:
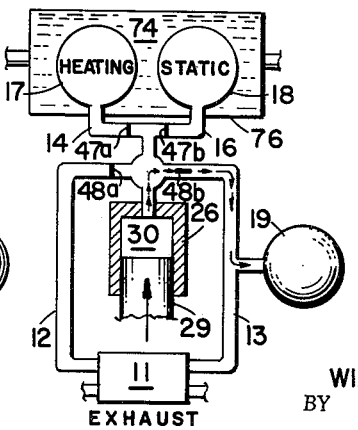

In FIGURE 4e, the piston starts the second half of the cycle. Intake is effected by the outward stroke of the piston 29 to draw in cool liquid from the line 12. During this stroke, the valve 48a is again opened and the other valves closed by the cams. This stroke corresponds to the stroke of FIGURE 4a in that it is also an intake stroke. However, at this time, the heater 17 is under low pressure and the heater 18 under high pressure which is the reverse of the conditions present in FIGURE 4a. After the intake stroke of FIGURE 4e, the valve 47a is opened by the cams while the other valves are closed so that when the piston 29 moves in, it compresses the liquid into the heater 17 as shown in FIGURE 4f. After the completion of the compression stroke of FIGURE 4f, the valve 47b is opened and the other valves are closed by the cams, thereby subjecting the piston 29 to the compressed and heated liquid with the heater 18 to effect the outward or power stroke of the piston as shown in FIGURE 4g. After this power stroke, the valve 48b is held open and the other valves closed by the cams, and the piston 29 moves inwardly to effect the last exhaust stroke of the cycle. During this stroke, the exhaust liquid is pumped out of the chamber 30 into the line 13 at low pressure and is stored in the accumulator 19 as shown in FIGURE 4h. The next stroke is a repetition of the stroke shown in FIGURE 4a. Therefore, the engine has a complete cycle every eight strokes or four revolutions.

By using two heaters 17 and 18, it is possible to provide a long heat cycle for each of the heaters. As an illustration, the heater 18 is being charged or pressurized in the FIGURE 4b and remains under pressure for heating until the power stroke of FIGURE 4g. If the compression is only assumed to be present from the mid-position of the compression stroke of FIGURE 4b to the mid-position of the power stroke of FIGURE 4g, it is apparent that the liquid contained in the heater 18 is being heated through 900° of crankshaft rotation, thereby providing sufficient time for the liquid contained within the heater to absorb enough additional heat to provide mechanical power. The same cycle takes place for the heater 17 although it takes place at a different time in the cycle.

If higher speeds are desired, it is possible to increase the number of heaters to more than two for each cylinder. In such engines, the heating cycle is equal to 180° plus the number of heaters minus one heater times 720°. Therefore, when two heaters are used as shown, the heating cycle of a given heater extends for 900° of crankshaft rotation. If three heaters are used, the heating cycle for a given heater extends through 1620° of crankshaft rotation and if four heaters are used, the heating cycle for a given heater extends through 2340° of crankshaft rotation.

The operation of an engine with more than two heaters per cylinder is essentially the same as in the illustrated embodiments wherein a power stroke on each heater is followed by a compression stroke on the same heater.

At the completion of the power stroke of FIGURE 4g, the liquid contained within the heater 18 is at a pressure substantially equal to the pressure maintained in the cooling circuit by the accumulator 19, as hereinafter explained. Therefore, this liquid is merely compressed and expanded during each stroke. This liquid retained in the heater serves as a liquid spring compressed by the working liquid from the chamber 30. By arranging the volume of the annular chamber 78 at least as large as the displacement volume of the cylinder, mixing of the relatively cool working liquid with the liquid already in the heater is minimized. This is desirable since the liquid permanently within the heater tends to stabilize at the temperature of the hot liquid 74 within the container 76. Therefore, if this liquid were mixed with the cool liquid, the resulting mixture of liquid would be at a temperature approaching the temperature of the hot liquid 74 and there would be a smaller temperature differential to cause the heat energy to flow into the working or compressed liquid. In other words, a larger temperature differential is present between the hot liquid 74 and the cool working or compressed liquid pumped into the heater when mixing does not take place, and since the heat flow through a given wall is a function of the temperature difference, a greater amount of heat energy flows into the working liquid producing more power.

As previously stated, the liquid originally contained within the heater and more particularly within the enlarged portion 82 thereto functions as a liquid spring and enables the pumping of cool working liquid from the cylinder 26 into the annular chamber 78 of the heater. It will be understood that other types of springs could be substituted for the liquid contained within the heater.

It is preferred to provide short pressure lines 14 and 16 and locate the heaters as close to the engine 10 as possible. Also, the pressure lines are of relatively small cross section since small volumes of liquid flow through the engine system even for high horsepower outputs. In this way, substantially all the liquid is displaced from the cylinder to the heater with a minimum amount of liquid remaining within the connecting system, which has a volume substantially less than the displacement volume of the cylinder. In the drawings, the various proportions have been exaggerated for purposes of illustration. In addition, the heat exchanger 11 and the accumulator 19 are substantially larger than illustrated.

Figure 7:
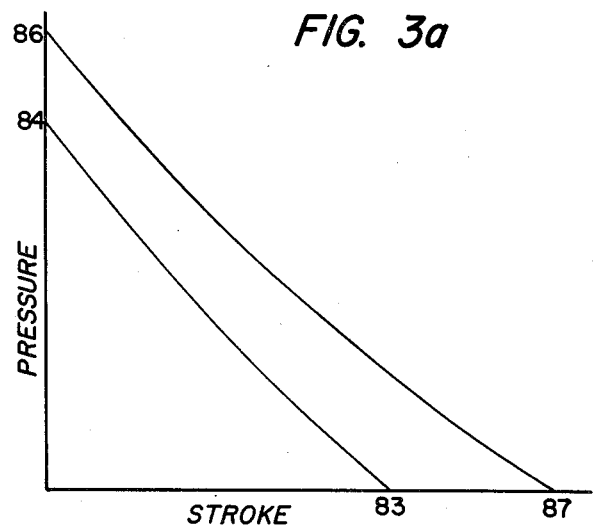
FIGURE 7 is a pressure-stroke diagram of the cycle of operation.

Referring to FIGURE 7, the pressure-stroke cycle of the engine 10 is illustrated. It is recognized that in actual operation heat transfer is not confined to only the portion of the stroke wherein the liquid is isolated within the heater, but since the power stroke and the compression stroke are of short duration when compared to the period of time the liquid remains compressed within the heater, most of the heat is transferred to the compressed liquid during the period wherein the heater containing the compressed liquid is closed or isolated from the system. The compression stroke is represented by the curve connecting the points 83 and 84 which is assumed to be an adiabatic compression which takes place during the compression stroke. The liquid within the heater is then heated at constant volume from the point 84 to the point 86. At the end of this heating, the power stroke takes place along the curve connecting the points 86 and 87, at the end of which the pressure of the liquid is returned to the initial pressure. Those skilled in the art will recognize that the work accomplished is represented by the area within the diagram 83, 84, 86, and 87.

Figure 8A:
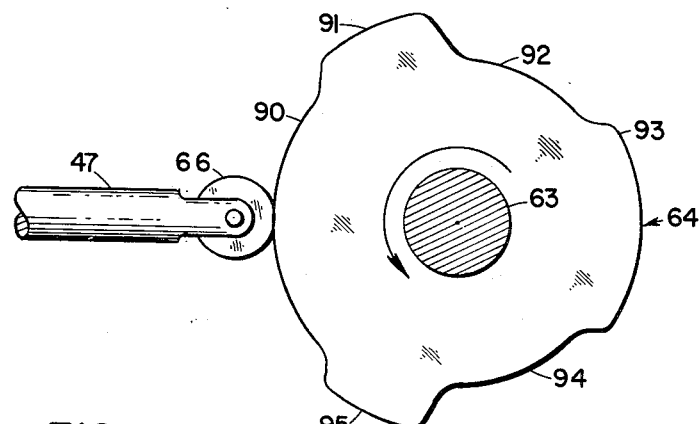
FIGURES 8a and 8b are enlarged fragmentary sections of the two cams used to operate the valves of the engine shown in FIGURES 1 to 4.

The cam 64 is shown at an enlarged scale in FIGURE 8a to illustrate the operation of the valve spool 47. The cam 64 is fixed to the cam shaft 63 for rotation in a counterclockwise direction as indicated by the arrow. The valve spool controls the fluid flow to the two heaters 17 and 18 operating to connect the heater 18 to the cylinder chamber 30 when the valve spool 47 is shifted to the left and connect the heater 17 to the cylinder chamber 30 when the valve spool is shifted to the right. When the elements are in the position shown, the cam follower 66 is in a dwell zone 90 and the valve spool 47 is in a position wherein it isolates both of the heaters 17 and 18 from the cylinder chamber 30. When the cam 64 has rotated to a point wherein the lobe 91 is under the cam follower 66, the valve spool 47 is shifted to the left to connect the heater 18 with the cylinder chamber 30. Further rotation of the cam 64 brings a first low portion 92 under the cam follower 66 which permits the valve spool 47 to shift to the right and establish communication between the heater 17 and the cylinder chamber 30. Still further rotation of the cam 64 brings a dwell portion 93 under the cam follower 66 at which time the valve isolates both of the heaters 17 and 18 from the cylinder chamber 30. The dwell portion 93 is followed by a second low portion 94 which moves under the cam follower 66 to permit the valve spool 47 to move to the right and establish communication between the heater 17 and the cylinder chamber 30. Following the second low portion is a second lobe 95 which operates the valve spool 47 to establish communication between the heater 18 and the cylinder chamber 30. This portion of the cam is followed by the dwell zone 90.

Figure 8B:
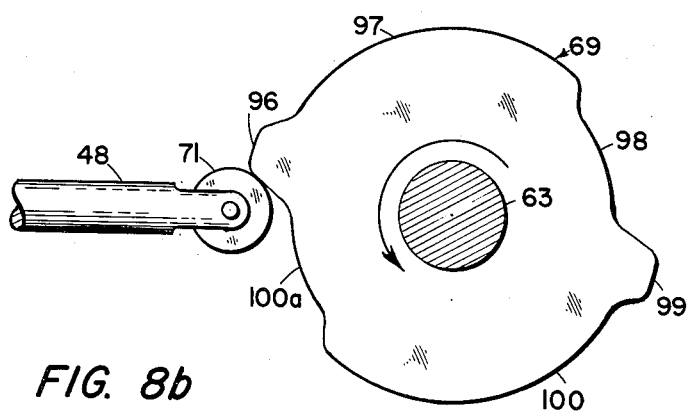

Referring to FIGURE 8b, the cam 69 is shown which is also connected to the cam shaft 63 and operates to move the valve spool 48 which controls the intake and exhaust valve spool 48 of the engine. When the elements are in the position shown, the valve spool 48 is in the closed position but is about to be moved to the left by a first lobe 96 to establish the intake connection. This lobe is followed by a dwell zone 97 which moves under the cam follower 71 to permit the valve spool 48 to isolate both the intake and exhaust lines 12 and 13 respectively from the cylinder chamber 30. Following the dwell zone 97 is a first low portion 98 which moves under the cam follower 71 to shift the valve spool 48 and to establish communication between the exhaust line 13 and the cylinder chamber 30. Beyond the first low portion 98 is a second lobe 99 which moves under the cam follower 71 to move the valve spool 48 to the left and provide communication between the inlet line 12 and the cylinder chamber 30. This lobe is followed by a second dwell zone 100 which moves under the cam follower 71 when the valve spool 48 is to isolate both the intake and exhaust lines. Following the second dwell zone 100 is a second low zone 100a which moves under the cam follower 71 during the following exhaust stroke to connect the exhaust line 13 with the cylinder chamber 30. It should be noted that the first dwell zone 90 of the cam 64 extends through substantially the same arc as the low zone 100a and the first lobe 96 of the cam 69 and that the second dwell zone 93 on the cam 64 extends substantially along the arc covered by the low zone 98 and the lobe 99 of the cam 69. Conversely, the two dwell zones 97 and 100 of the cam 69 correspond in position to the operation portions of the cam 64.

Figure 8C:
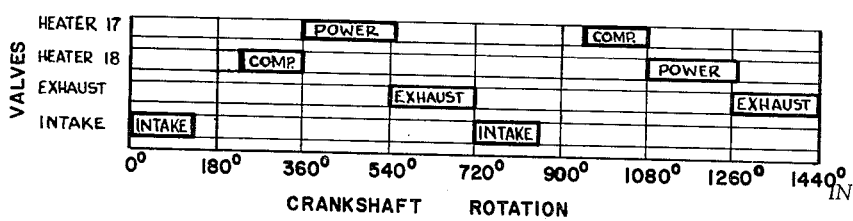
FIGURE 8c is a pictorial representation of the valve operation of the engine shown in FIGURES 1 through 4.

Reference should now be made to FIGURE 8c wherein the valve operation is plotted against crankshaft rotation. This plot shows the complete cycle of four revolutions of the crankshaft. The intake valve is opened at the beginning of the cycle but is closed before the end of the intake stroke so that there is not a full charge of liquid within the cylinder chamber 30 at the beginning of the compression stroke. After the intake valve closes, the remainder of the intake stroke of the piston draws a vacuum in the cylinder chamber 30. By closing the intake valve before bottom dead center, I insure that the beginning of the actual liquid compression illustrated by the point 83 on the pressure stroke diagram of FIGURE 7 is displaced to the left from the fully expanded position indicated at the point 87. At the end of the intake stroke, the piston starts to move toward its top dead center position but the valve 47 does not move to connect the chamber 30 with the heater 18 until the pressures are equalized at about the point 83 of FIGURE 7. The liquid is then compressed from the cylinder chamber to the heater 18 as indicated by the compression block between 180° and 360°. When the piston reaches top dead center, the valve spool 47 shifts so that the heater 18 is isolated from the cylinder chamber 30 and the heater 17 is brought into communication with the cylinder chamber 30. The valving is preferably arranged so that on the power stroke, the heater 17 remains connected to the chamber 30 for a short period after the opening of the exhaust. As illustrated, this overlap is provided after bottom dead center. This insures that the pressure of the liquid within the heater 17 is returned to the low pressure determined by the accumulator 19.

At the end of the exhaust stroke, a second intake stroke extends from the top dead center position of 720° but is cut off before the bottom dead center position is reached for the reason stated above. The compression stroke for the heater 17 again extends from a point after the bottom dead center position of 900° to the top dead center position of 1080°. At the completion of this compression stroke, a second power stroke is provided by connecting the heater 18 to the cylinder chamber 30. Here again, an overlap is provided between this power stroke and the following exhaust stroke to insure that the heater 18 is returned to the pressure of the low pressure portion of the system. At the completion of the full eight strokes, or 1440° of crankshaft rotation, a complete cycle finished and the engine is ready to start the following cycle at the 0° point.

Preferably, the working liquid used has lubricating qualities, a relatively high co-efficient of expansion and a relatively low specific heat at the operating pressures. The particular liquid chosen will be determined by the temperature range of the engine and the particular characteristics desired. However, oils such as the petroleum base hydraulic fluid referred to above, have sufficiently good properties to produce good efficiencies. It should be understood that this invention is not limited to any particular liquid or to any particular temperature difference, temperature range or pressure so long as the temperatures and pressures throughout the cycle are so related as to maintain the working liquid in the liquid state by preventing it from passing into either the solid or gaseous states.

Reference is now made to FIGURE 5 wherein a multi-cylinder embodiment of an engine is schematically shown. In this second embodiment, liquid is used again to power the engine but in this case there are an equal number of cylinders and heaters. In the particular engine, eight cylinders and heaters are shown but it should be understood that a greater or a lesser number could be used. Also, the engine is shown as an in-line type engine but a radial or other geometric forms of engine would function equally well. In this figure, all of the elements which are not essential to an understanding of the operation of the engine have been eliminated to simplify the description and understanding thereof. It should be understood, however, that housings, bearings, supports, and cam shafts such as shown in the first embodiment, are included in the complete engine.

A stationary shaft 101 is supported at its ends and provides the pivot support for the cylinder heads 102 through 109. Each of the cylinder heads is formed with an end portion 111 through which the shaft 101 projects. Therefore, the cylinder heads 102 through 109 are pivoted in a manner similar to the cylinder head of the first embodiment for oscillating rotary motion around the axis of the shaft 101. Pistons 112 through 119 project into each of the cylinder heads 102 through 109 respectively and cooperate in the usual manner to provide the piston and cylinder combination. Each of the pistons 112 through 119 is in turn pivotally connecting to a crankshaft 121 which is journalled for rotation about the main axis 130 thereof. Positioned beside each of the end portions 111 of the cylinder heads 102 through 109 is a stationary collar 122 through 129 respectively through which the shaft 101 projects. In each case, means are provided to connect the collars 122 through 129 to the shaft 101 to prevent movement of the collars. Fluid connections (not shown) are provided to connect the cylinder above the pistons to each of the associated collars 122 through 129 and the collars are in turn provided with pressure lines 132 through 139 in fluid communication with these passages. Thus, a swivel fluid connection of a type similar to the one shown in the first embodiment provides permanent fluid communication between the cylinder 102 and the pressure line 132 and each of the remaining cylinders and their associated pressure lines.

The pressure lines 132 through 139 each connect to associated valves 142 through 149. The valves 142 through 149 are associated with pressure lines 152 through 159 respectively which connect each of the valves to adjacent heaters 162 through 169. In addition, each of the valves is connected to adjacent heaters 162 through 169 respectively through pressure lines 172 through 179. In the case of the valve 149, a long pressure line 179 is necessary to connect it to the heater 162. Each of the valves 142 through 149 is also provided with an inlet line 181 and an outlet line 182. The inlet lines 181 are connected together and are connected to a cooling heat exchanger 183 through a manifold 184. Similarly, the lines 182 are connected together and to the inlet of the heat exchanger 183 through a manifold 186. Here again, an accumulator 187 is connected to the manifold 186 to prevent excessive pressures from building up in the low pressure circuit. Supply and outlet connections for cool fluids illustrated at 188 and 189 respectively can be connected to any cooling source. Also, the heaters 162 through 169 are either immersed in a single heating tank 191 as shown in FIGURES 6a through 6h or supplied with individual heating means as desired. In order to maintain FIGURE 5 clear and understandable, I have not shown the heater tank 191, a cam shaft, or valve operators. Normally, the valves 142 through 149 are operated in a manner similar to the mechanism illustrated in FIGURE 2 but in this case, the cam shaft is geared to run at one-half the speed of the crankshaft because a cycle is completed every four strokes.

Reference is now made to FIGURES 6a through 6h for an understanding of the operation of the multi-cylinder engine. These figures sequentially show the positions the elements assume as the crankshaft rotates through a full two revolutions or four strokes of the pistons. The views, however, are taken at 90° intervals rather than the full 180° intervals of the previous embodiment. In FIGURES 6a through 6h, each of the pistons is moving in a direction indicated by the arrow on the associated piston and is going through the stroke operation indicated below each piston. To understand the operation, the cycle discussion will be limited to the two cylinders 102 and 103 and their associated pistons 112 and 113 which are representative of the operation of all of the pistons and cylinders.

Figure 6A:
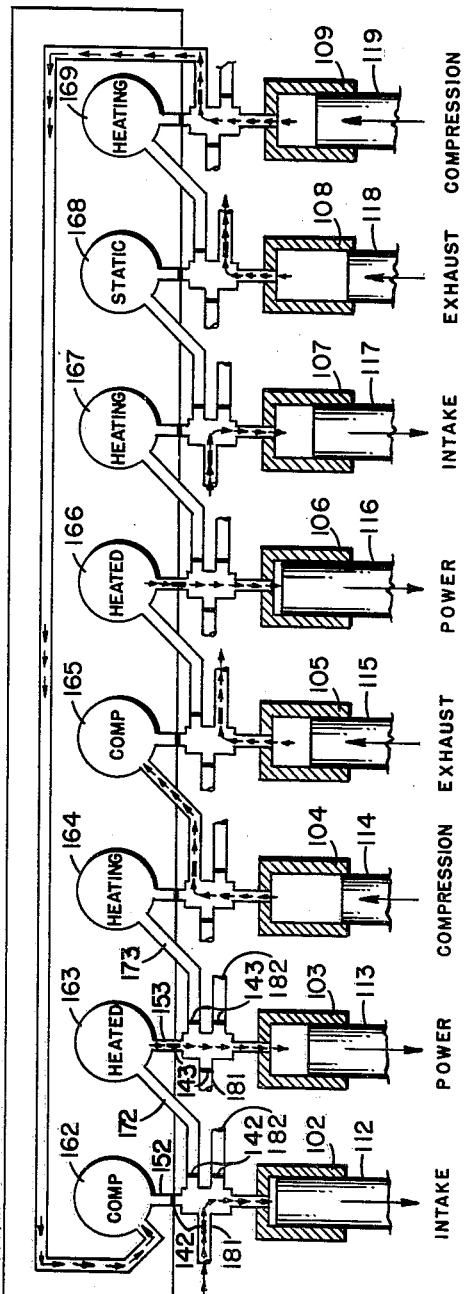

In FIGURE 6a, the piston 112 is moving down on the intake stroke so cool low pressure liquid flows into the cylinder 102 through the intake line 181. The exhaust line 182 is closed by the valve 142 as are the pressure lines connecting the valve 142 to the heaters 162 and 163. Therefore, the only open pressure line connected to cylinder 102 is the low pressure intake line 181. At the same time, the cylinder 103 and its associated piston 113 is on a power stroke and the piston is moving downwardly. It should be noted that the piston 112 is one-half way through its power stroke but that the piston 112 is just commencing to move on its intake stroke. This is due to the fact that the crankshaft displaces the adjacent pistons 90° of rotation apart. During the power stroke, the valve 143 isolates the intake line 181, the exhaust line 132, and the pressure line 172 from the cylinder 103 and provides communication between the heater 163 and the cylinder 103 through the pressure line 153.

Figure 6B:
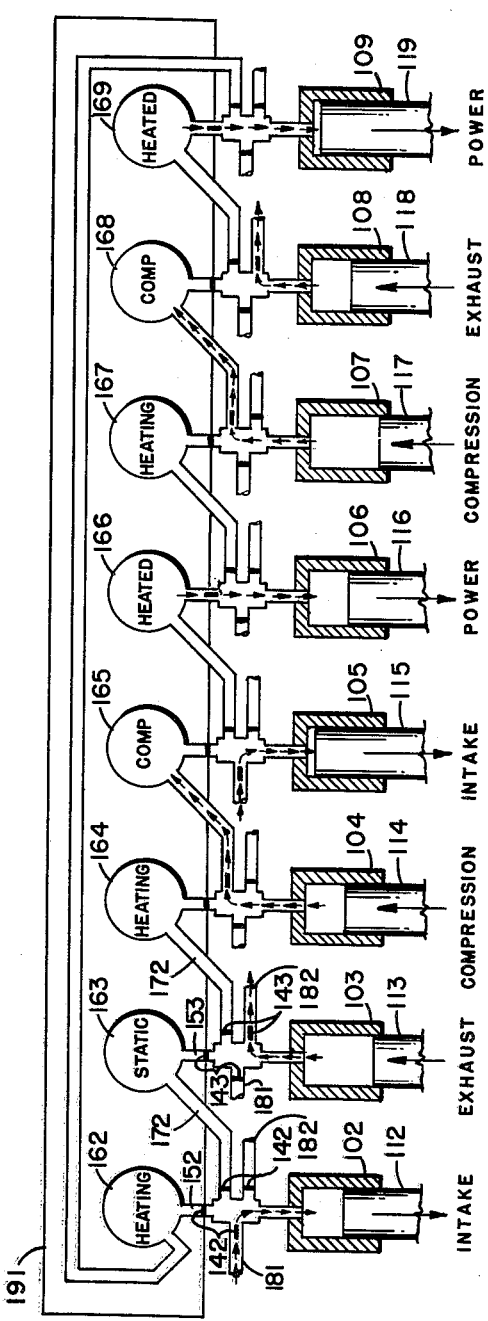
Figure 6C:
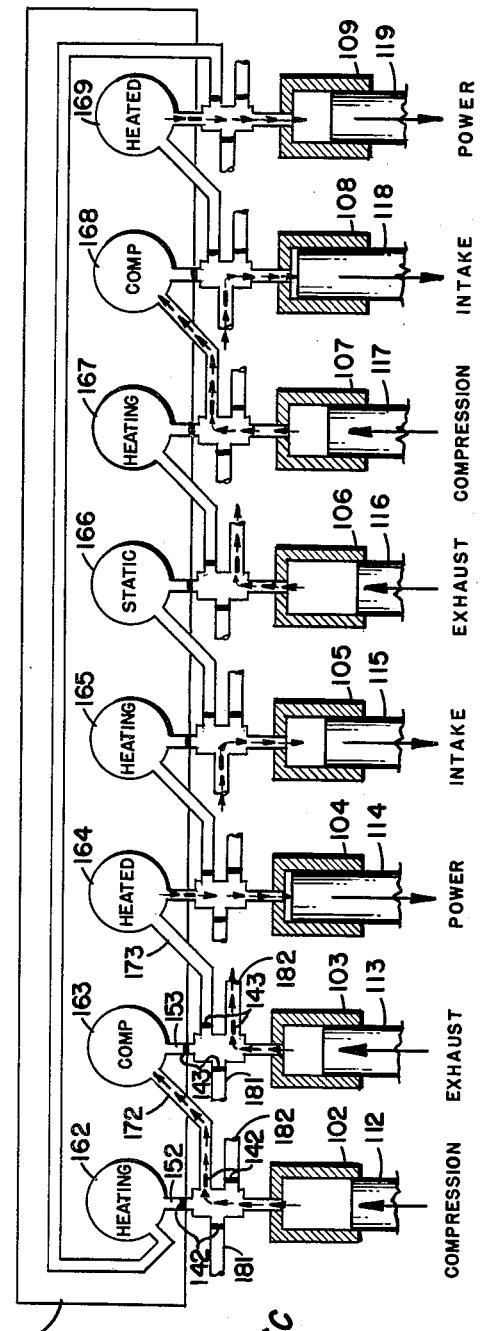

When the piston 113 completes its power stroke, the elements assume the position shown in FIGURE 6b wherein the piston 113 is commencing its exhaust stroke and the piston 112 is still on its intake stroke. At this time, the heater 163 is at low pressure and the heater 162 has already been compressed by the piston 119. The valve 142 remains in the same position because the piston 112 has not completed its intake stroke but the valve 143 is operated to provide fluid communication between the cylinder 103 and only the exhaust pressure line 182. This condition continues until the elements reach the position of FIGURE 6c wherein the piston 112 commences its compression stroke and the piston 113 is midway in the exhaust stroke. The valve 142 is operated to provide fluid communication with only the pressure line 172 so the cylinder 102 is connected to the heater 163. Therefore, even though the heater 163 operates to provide the power for the cylinder 103, it is compressed by the cylinder 102. Of course, the valve 143 remains in its exhaust position during this phase.

Figure 6D:
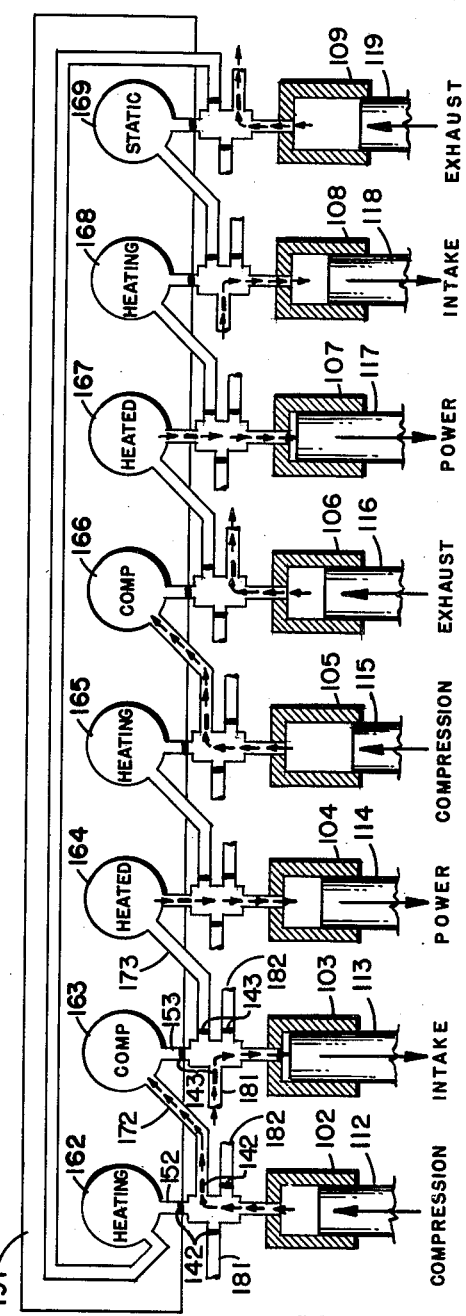
Figure 6G:
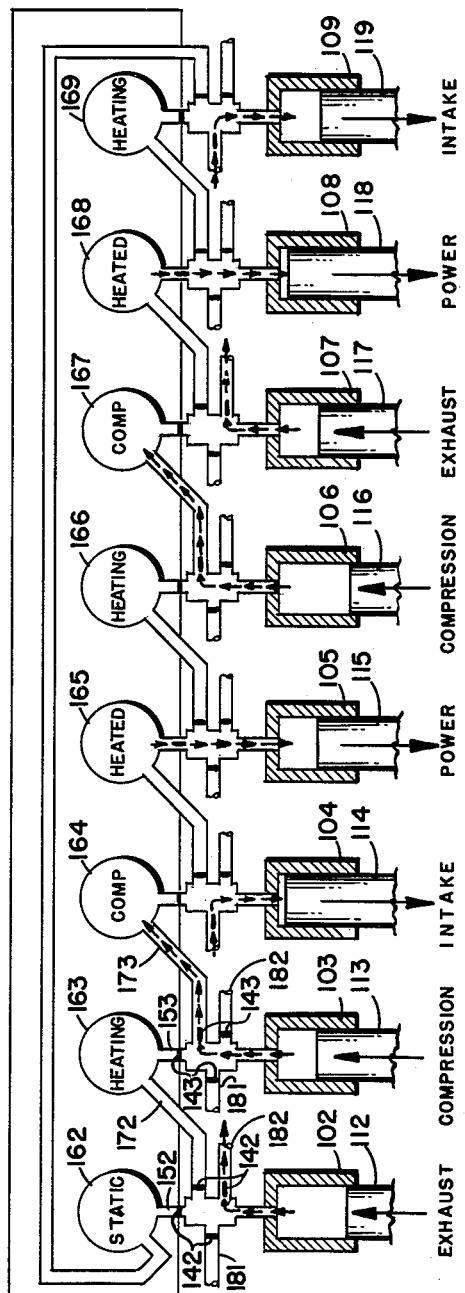
Figure 6H:
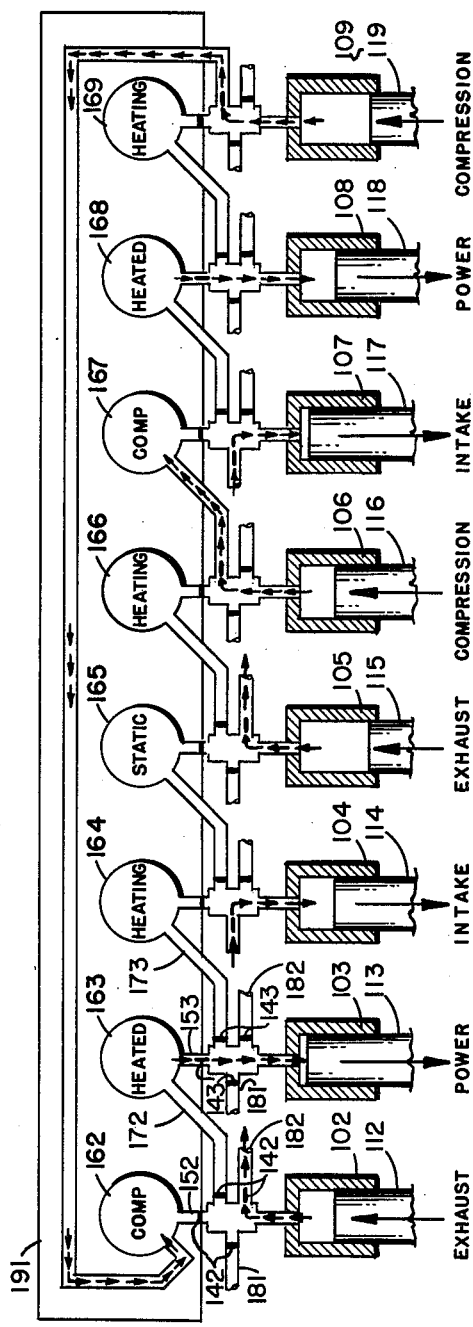

When the elements reach the position of FIGURE 6d, the piston 112 is midway in its compression stroke and the piston 113 has completed its exhaust stroke. Therefore, the valve 143 is changed to provide communication between the line 181 and the cylinder 103 so that intake liquid can flow into the cylinder 103. When the elements reach the position of FIGURE 6e, the piston 112 commences the power stroke so it is connected with the heater 162, which has been previously compressed and heated, and the piston 113 continues its intake stroke.

In FIGURE 6f, the piston 113 has finished its intake stroke and is starting the compression of the heater 164 so the valve 143 is operated to provide necessary fluid communication. At the same time, the piston 112 is continuing its power stroke. After an additional 90° of crankshaft rotation, the elements assume the position of FIGURE 6g wherein the piston 112 is on its exhaust stroke so fluid communication is provided between the cylinder 102 and exhaust line 182. At the same time, the piston 113 is continuing to compress the liquid within the heater 164. Still another 90° of rotation of the crankshaft moves the elements to the position of FIGURE 6h at which time the piston 113 starts its power stroke and is therefore connected to the heater 162. During this phase, the piston 112 is in its exhaust stroke. Still a further 90° of rotation returns the elements to the position shown in FIGURE 6a thus completing a full four-stroke cycle.

An inspection of FIGURES 6a through 6h will show that each of the heaters is only unpressurized or static through 90° of crankshaft rotation so each heater is under pressure through substantially the full cycle. Therefore, sufficient time elapses while the liquid within the heaters is compressed to provide for the heat transfer from the hot fluid within the heating tank 191. The pressure volume cycle of both embodiments is the same so it need not be discussed in detail in connection with the second embodiment.

An engine, according to this invention, has numerous advantages; one of the most important of which is that liquids develop high pressures with low temperature differentials and such high pressures produce high torque with small pistons. Therefore, the entire size of the engine for a given horsepower and speed is reduced. This advantage is not materially reduced by the fact that the wall thicknesses of the pressure vessels must be chosen to withstand the high pressures encountered. The fact that high pressures are encountered does not necessitate excessive weight because very small volumes of liquid are required to produce a given horsepower compared with the required volumes in a gas engine. Another important advantage is that a low temperature heat source can be used to operate the engine. The engine is, therefore, particularly suited for use with atomic power, solar heat, waste gases from other engines or processes, or heat sources occurring in nature. Also, the difficulties so prevalent in present day engines in providing materials which will withstand the elevated temperature in such gas engines is eliminated and substantially any of the known metals can be used in the fabrication of the liquid engine.

Also, no water jacket or other cooling system is used on the working cylinders, thereby substantially improving the efficiency.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A liquid engine comprising a motor compressor means including a cylinder, a piston movable in said cylinder, and an output element connected for movement by said piston; first and second heaters, means supplying heat energy to said heaters, a liquid cooler, valved means selectively connecting in timed relationship with movement of said output element said cylinder to said heaters alternately and to said cooler to form a closed engine system, and a compressible liquid filling said entire engine system, said motor compressor means receiving liquid from said cooler during one expansion stroke and compressing it into said first heater wherein during the return stroke it is heated while the liquid in said second heater is admitted to and expanded in said motor means driving the succeeding expansion stroke to produce movement of said output element.

2. A liquid engine comprising a cylinder, a piston axially movable in said cylinder co-operating therewith to define a chamber the volume of which is changed by movement of said piston relative to said chamber, a rotatable crankshaft, a connection between said crankshaft and piston moving said piston in response to rotation of said crankshaft alternately providing in-strokes and out-strokes of said piston realtive to said cylinder, first and second heaters, means supplying heat energy to said heaters, a cooler having an inlet and an outlet, a valve selectively connecting said chamber to said heaters and cooler, means connecting said valve and crankshaft cycling said valve every four revolutions of said crankshaft, a compressible liquid filling said chamber, heaters, and cooler, said cycle including sequential operation of said valve to connect said outlet and chamber on an out-stroke transferring cool liquid to said chamber, connecting said chamber and first heater in the following in-stroke compressing cool liquid in said first heater, connecting said chamber and second heater on the following out-stroke expanding liquid from said second heater into said chamber, connecting said chamber and inlet in the following in-stroke expelling the liquid contained in said chamber to said cooler, connecting said outlet and chamber on the following out-stroke transferring cool liquid to said chamber, connecting said chamber and second heater on the following in-stroke compressing cool liquid in said second heater, connecting said first heater and chamber on the following out-stroke expanding the liquid in said first heater into said chamber, and connecting said chamber and inlet expelling the liquid from said chamber into said cooler on the following in-stroke.

3. An engine comprising a cylinder, a crankshaft, a piston connected to said crankshaft and reciprocable in said cylinder, said piston and cylinder cooperating to define a variable volume chamber, a source of liquid, heater means, a passageway connecting said chamber with said source of liquid, a plurality of passageways connecting said chamber with said heater means, an exhaust passageway connected to said chamber, valves for opening and closing said passageways, and valve operating means driven in timed relation to said crankshaft and operating to open said chamber in sequence to said source of liquid for an intake stroke, to one passageway connected to said heater means for a compression stroke, to another passageway connected to said heater means for a power stroke and to said exhaust passageway for an exhaust stroke.

4. An engine comprising a cylinder, a crankshaft, a piston connected to said crankshaft and reciprocable in said cylinder, a source of liquid, a plurality of heater chambers, passageways connecting said cylinder with said source of liquid and with each of said heater chambers, an exhaust passageway connected to said cylinder, valves for opening and closing said passageways and valve operating means driven in timed relation to said crankshaft and operating to open said cylinder in sequence to said source of liquid for an intake stroke, to one of said heater chambers for a compression stroke, to another of said heater chambers for a power stroke and to said exhaust passageway for an exhaust stroke.

5. In an engine, an output member, expansible chamber means connected to move and to be moved by said output member, a heater, a source of liquid, a valved intake passageway connecting said source of liquid with said chamber means, a valved compression passageway connecting said chamber means with said heater, a valved power passageway connecting said heater with said chamber means, and a valved exhaust passageway connected to said chamber means, operating means opening and closing certain of said valved passageways and connected to be moved in timed relation to the movement of said output member, and said chamber means and valve operating means being movable through a cycle comprising periods of withdrawing liquid from said source, elastically compressing such liquid into said heater, withdrawing heated compressed liquid from said heater, elastically expanding such liquid to a lower pressure, and discharging the expanded liquid through said exhaust passageway.

6. A process for the conversion of heat energy into mechanical power which comprises the steps of separately compressing isolated quantities of a liquid working medium into a plurality of heaters, adding heat to said compressed medium while in said heaters, separately expanding said heated compressed medium from said heaters to a lower pressure within expansible chamber means connected to a mechanical power output, and maintaining said medium in the liquid state throughout said process, wherein said expanding steps are intermediate said compressing steps.

7. A process for the conversion of heat energy into mechanical power which comprises compressing a liquid working medium by a moving working surface, adding heat to said compressed medium, expanding said heated compressed medium to a lower pressure against said working surface, to move the latter utilizing the movement of said working surface to produce mechanical power output, and maintaining said medium in the liquid state throughout said process.

8. A liquid engine comprising an output member, a plurality of cylinders, each having a piston connected to said output member, heating means filled with compressed heated liquid, fluid passageways connecting each of said cylinders to said heating means, exhaust passageways connected to said cylinders, valve means connected to said output member for operation in timed relation to the movement thereof for opening and closing both said passageways, said valve means being timed to sequentially open said cylinders to said heating means to receive a quantity of compressed heated liquid and to sequentially open said cylinders to said exhaust passageways, said engine having means for compressing liquid into said heating means.

9. A liquid engine according to claim 8 in which said heating means comprises a single heater connected to a plurality of cylinders.

10. A process for the conversion of heat energy into mechanical power which comprises the steps of compressing separate isolated quantities of a liquid working medium into heating means, adding heat to said compressed medium, sequentially expanding said heated compressed medium from said heating means against a plurality of separate movable working surfaces to move the latter, utilizing the movement of said working surfaces, to produce mechanical power output, and maintaining said medium in the liquid state throughout said process, wherein said sequential expanding steps are intermediate said compressing steps.

References Cited in the file of this patent

UNITED STATES PATENTS

| | | |
|---|---|---|
| 226,570 | Thuemmler | Apr. 13, 1880 |
| 311,102 | Boulton et al. | Jan. 20, 1885 |
| 730,248 | Friedenthal | June 9, 1903 |
| 750,494 | Schütt | Jan. 26, 1904 |
| 1,032,236 | Patten | July 9, 1912 |
| 1,426,462 | Claude | Aug. 22, 1922 |
| 2,471,832 | McCollum | May 31, 1949 |
| 2,632,995 | Noe | Mar. 31, 1953 |
| 2,839,046 | Kamm | June 17, 1958 |